United States Patent [19]

Sherman

[11] Patent Number: 5,213,337

[45] Date of Patent: May 25, 1993

[54] SYSTEM FOR COMMUNICATION USING A BROADCAST AUDIO SIGNAL

[76] Inventor: Robert Sherman, 1555 Rising Glen Rd., Los Angeles, Calif. 90069

[21] Appl. No.: 215,655

[22] Filed: Jul. 6, 1988

[51] Int. Cl.⁵ .............................. A63F 9/22; A63F 9/24
[52] U.S. Cl. ...................................... 273/439; 273/433; 273/DIG. 28; 455/2; 364/410; 434/307; 434/323
[58] Field of Search .......... 273/85 G, DIG. 28, 1 ES, 273/1 E, 433, 434, 439; 434/323, 336, 350, 307, 308; 358/84, 86; 455/2, 5, 46, 233

[56] References Cited

U.S. PATENT DOCUMENTS

| | | | |
|---|---|---|---|
| Re. 32,305 | 12/1986 | Baer | 273/85 |
| 3,245,157 | 4/1966 | Laviana | 434/336 |
| 3,777,410 | 12/1973 | Robinson | 35/1 |
| 4,019,737 | 4/1977 | Witzel | 273/94 |
| 4,034,990 | 7/1977 | Baer | 273/85 |
| 4,194,198 | 3/1980 | Baer et al. | 273/85 G |
| 4,305,131 | 12/1981 | Best | 364/521 |
| 4,333,152 | 6/1982 | Best | 364/521 |
| 4,359,223 | 11/1982 | Baer | 273/85 |
| 4,422,105 | 12/1983 | Rodesch et al. | 358/903 |
| 4,445,187 | 4/1984 | Best | 364/521 |
| 4,547,851 | 10/1985 | Kurland | 34/401 |
| 4,553,283 | 11/1985 | Kurland | 364/900 |
| 4,569,026 | 2/1986 | Best | 364/521 |
| 4,572,509 | 2/1986 | Sitrick | 273/85 |
| 4,592,546 | 6/1986 | Fascenda et al. | 273/1 |
| 4,672,541 | 6/1987 | Bromley | 364/410 |
| 4,695,953 | 9/1987 | Blair et al. | 364/410 |
| 4,718,106 | 1/1988 | Weinblatt | 455/2 |
| 4,722,526 | 2/1988 | Tovar et al. | 273/1 |
| 4,745,468 | 5/1988 | Von Kohorn | 358/84 |
| 4,807,031 | 2/1989 | Broughton et al. | 273/DIG. 28 |
| 4,815,733 | 3/1989 | Yokoi | 273/1 E |
| 4,840,602 | 6/1989 | Rose | 273/1 E |
| 4,844,475 | 4/1989 | Saffer et al. | 273/1 E |
| 4,846,693 | 7/1989 | Baer | 434/308 |
| 4,955,070 | 9/1990 | Welsh et al. | 455/2 |

OTHER PUBLICATIONS

High Technology Business, Jeffrey Zygmont, Compact-Disc Companies Test New Frontier, Feb. 1988, pp. 18–23.
CD-ROM REVIEW, Bryan Brewer, Still Waiting for "It" To Happen, Feb. 1988, pp. 15–51.
Video Week, Interactive Systems Aim AT VCR, Cable, VCST, Feb. 22, 1988 vol. 9, No. 8, pp. 4–5.
Electronic Engineering Times; Doherty, Interactive T.V. on Horizon, Feb. 15, 1988, pp. 1 and 8.
Hollywood Reporter; Winikoff, Feb. 12, 1988, "B.Caster's Gamble on 2-Way Sports" p. 40.
The Media Lab; Stewart Brand, Inventing the Future at MIT, 1987, pp. 39–53.

Primary Examiner—Jessica J. Harrison
Attorney, Agent, or Firm—Lyon & Lyon

[57] ABSTRACT

This invention involves a system of communicating information using audio signals. In one embodiment, the information is encoded in touch tones on the sound track of a television game show. The information relates to the action of the show, and is broadcast in-band with the audio portion of the show. The show, and thus the information encoded in its audio portion, is received by an ordinary home television. A device for playing a game "listens" to the television speaker and decodes the information. The device allows home viewers to play a game based on the action of the show. The touchtones are substantially indiscernible to humans because they are quieter than most of the audio portion of the show, they are very brief, and they are masked by the show's usual sound effects.

20 Claims, 3 Drawing Sheets

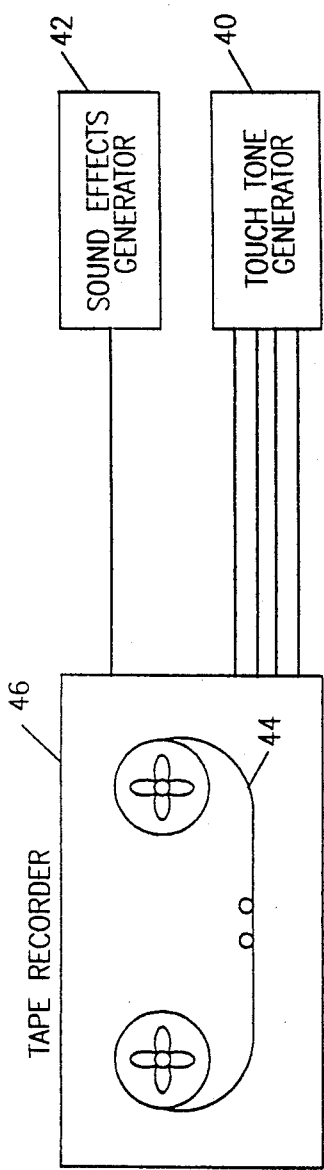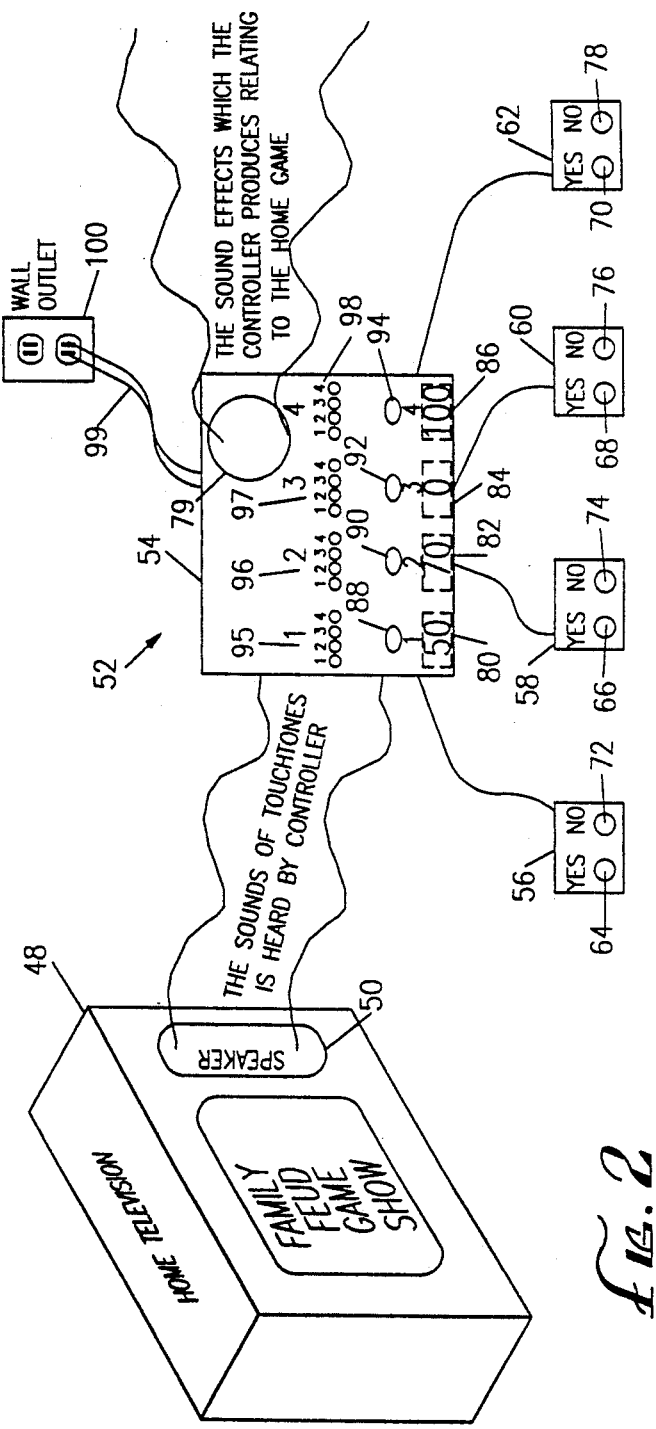

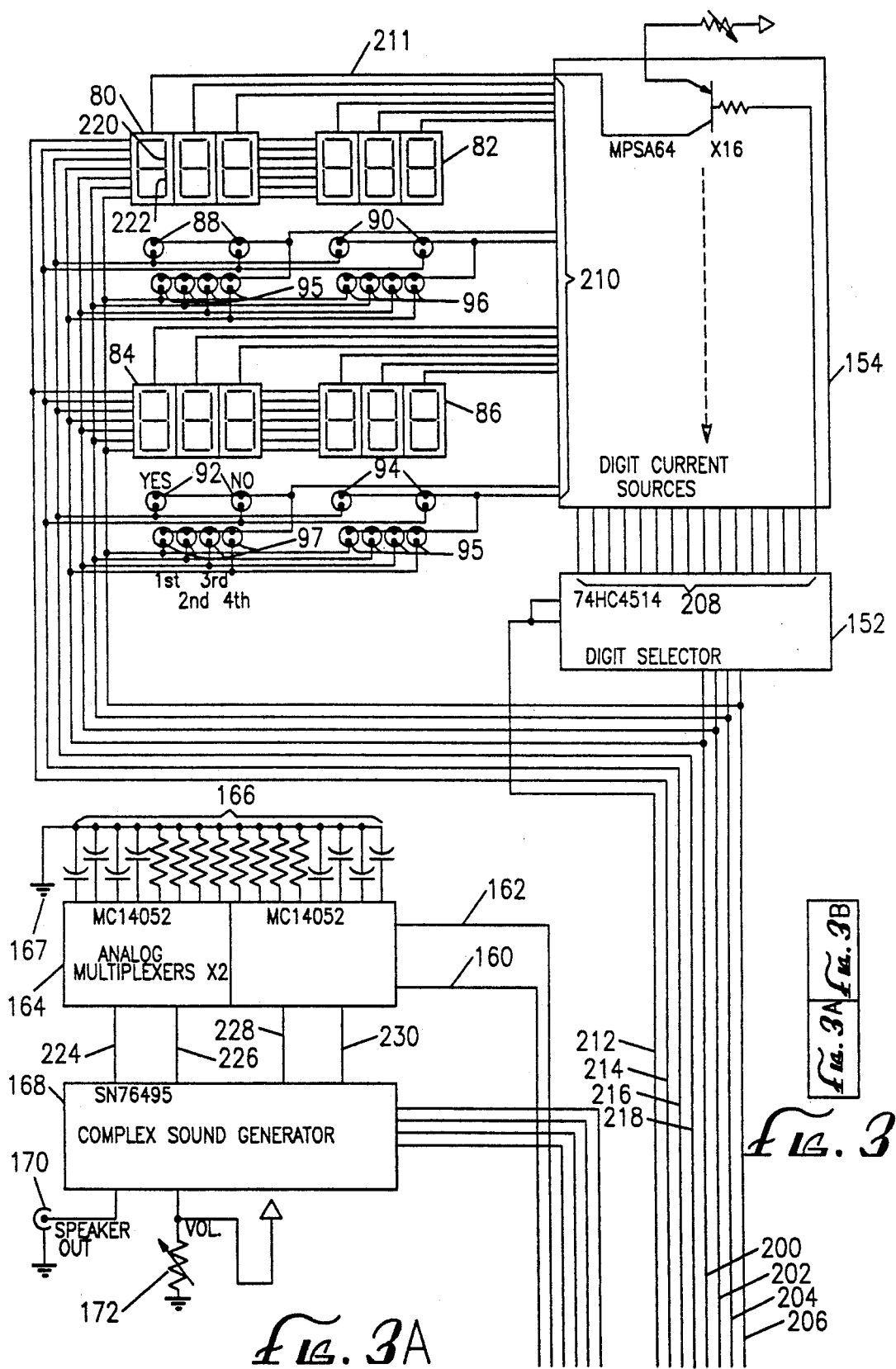

SYSTEM FOR COMMUNICATION USING A BROADCAST AUDIO SIGNAL

BACKGROUND OF THE INVENTION

The present invention relates to a system for communication using a broadcast audio signal being played over the speaker of a television or radio and an unconnected device located anywhere within the normal listening area. Until now, no system existed for communication through a television broadcast signal to a device locatable anywhere in general proximity to a television or radio receiver.

A remote system for playing a game while watching a live sports event on television is described in Fascenda et al., U.S. Pat. No. 4,592,546. However, the game control information does not come through the television receiver. Rather, it requires employment of sub-carrier techniques, and installation of special receivers capable of detecting out-band signals. Since the information is part of a separate signal, it cannot be taped for later use and must be produced by a live person anew upon each broadcast.

A system for playing games on a television picture screen is presented in Baer U.S. Pat. No. re. 32,305. It utilizes flashing "dots" to mean various things. The flashing dots appear in plain view on the screen, each representing an answer to a multiple choice question. The dot representing the correct answer has an odd number of flashes. The others have an even number. A gun with a photoelectric cell is aimed at a dot to choose the corresponding answer. The gun will light an indicator light if it detects a dot flashing an odd number of times. Alternatively, the photoelectric cell can be attached directly to a predetermined spot on the television screen.

The system of Baer has a number of shortcomings. It requires disturbing the normal television picture by the addition of brightly flashing lights in a specially dedicated portion of the screen. It also requires that the detecting device be aimed or placed directly on a predetermined spot of the television screen. It uses the video portion of a broadcast and so is inoperative with other communication receivers such as radios.

An audio signal is used by cable television networks to switch on and off a machine located at their local television stations. The signal consists of sequential Touch-Tones and it is used to turn on a tape player to broadcast a commercial advertisement. Another signal turns the player off, returning the broadcast to the network program.

This arrangement is limited in at least the following three ways. First, it employs only two different signals to simply turn a machine on or off. No significant information is communicated. Second, it is used only in-house, for the network to switch on its own station's machine. The station receives the signal from its source at the network over enormous dish antennae. Third, the signal is discernible to viewers, even though they have no use for it. The network momentarily blanks out the audio portion of its broadcast and instead plays multiple sequential Touch-Tones alone at a high volume.

Accordingly, it is an objective of the present invention to provide a communication system useful to anyone listening to a television or radio receiver. It is a further objective that encoded information employed in such a system be susceptible of taping.

It is yet another objective of the present invention to provide such a system that does not require disturbing or dedicating a portion of a normal television picture. It is another objective to provide a device for receiving information from a communication receiver, that need not be aimed at or attached in any way to the receiver. It is another objective that such system employ the audio portion of a broadcast so it is useful with radios as well as television.

It is still another objective of the present invention to use an audio signal to communicate various information. It is another objective that such communication be to the public and take place through the speaker of an ordinary television or radio receiver such that the recipient of the information need not have special receiving equipment. It is another objective that such signal be substantially indiscernible to listeners.

SUMMARY OF THE INVENTION

In accordance with the above objectives, the present invention provides a communication system using an encoded audio broadcast signal which is played over the speaker of an ordinary television or radio. The signal is encoded with tones representing various information. The information is communicated to members of the public who do not need special receiving equipment to receive the communication.

Information is encoded in-band in the same broadcast as a television or radio program, and so is detectable by a listening device directly from the usual speaker and can be taped for later or repeated use by a broadcaster or listener.

At the same time, the encoded information is substantially indiscernible to people watching or listening to the program which contains the information and therefore does not disturb an ordinary program or require blanking of part of the program signal to provide a dedicated portion for encoded information.

The apparatus employed for detecting and decoding the encoded information need not be aimed or attached in any way to the receiver. Further, the present system operates through the audio portion of a broadcast signal, so it is useful with any television or radio receiver. A listening device including means for detecting and decoding the information is provided which can be placed anywhere in proximity to a television or radio receiver.

BRIEF DESCRIPTION OF DRAWINGS

FIG. 1 is a block diagram illustrating how encoded information is added to the audio portion of a program in the preferred embodiment.

FIG. 2 is a sketch of a game set up for use in the preferred embodiment.

FIG. 3 is a block diagram of FIGS. 3a and 3b.

FIGS. 3a and 3b are a schematic diagram of the game controller as employed in FIG. 2.

DETAILED DESCRIPTION OF THE PREFERRED EMBODIMENT

Figure 3B:
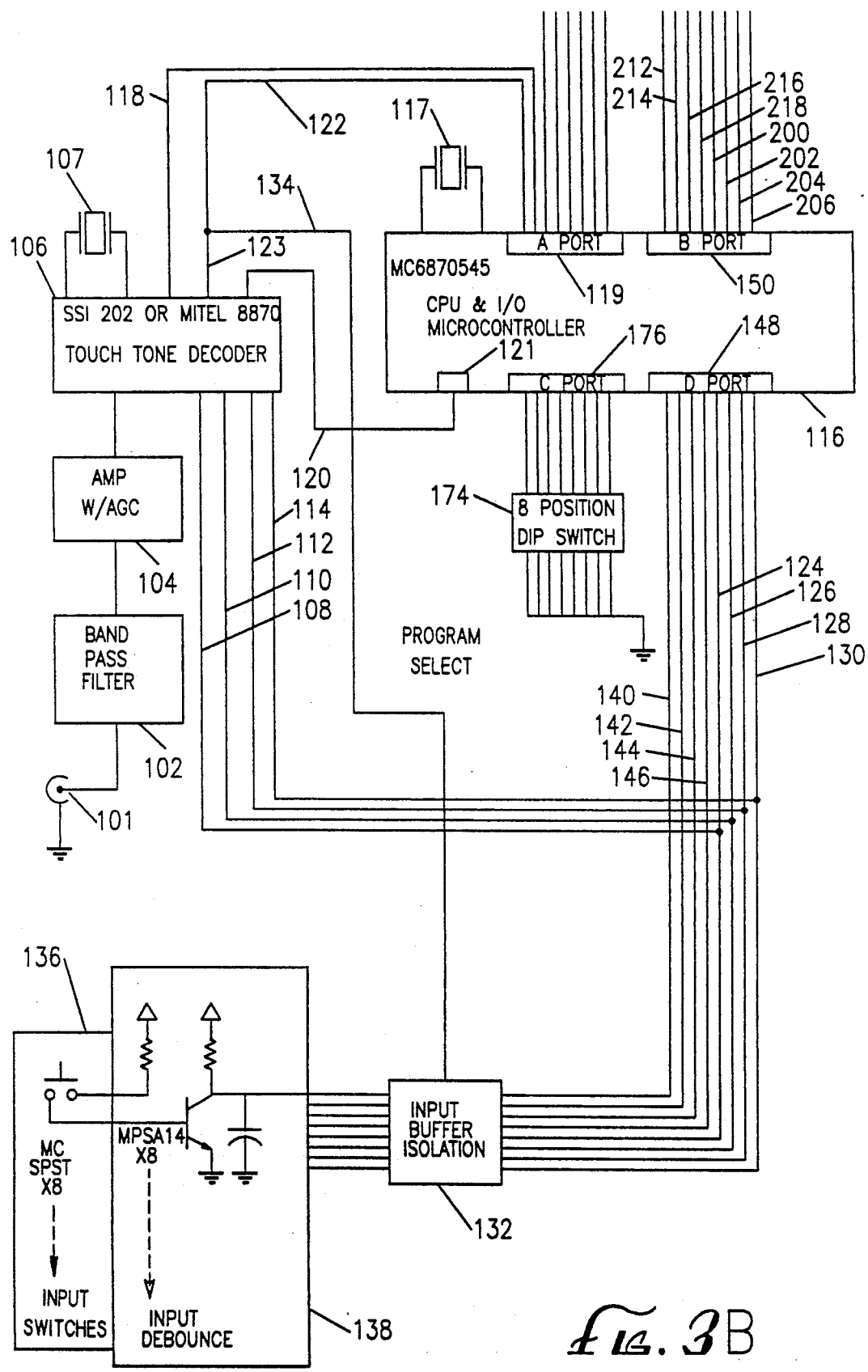

In the preferred embodiment, tones in the audible range are broadcast to communicate information through the audio output of an ordinary television or radio receiver to an apparatus for playing a game.

FIG. 1 illustrates how tones of the audible range, such as Touch-Tones (697–1477 Hz), can be added to the audio-video tape 44 of a regular program. The tones are created by a studio engineer using a Touch-Tones generator 40. This is done at the same time as the engineer creates the program's usual sound effects with a sound effects generator 42, or later. The tones and the usual sound effects are added at appropriate places to the audio-video tape 44 of the program using a tape recorder 46.

There are other ways to ensure that an appropriate tone is included in the audio portion of a television or radio broadcast. For example, an engineer watching the program as it is recorded or as it is broadcast live could use a Touch-Tone generator 40 to create the tones appropriate to the action of the program, thereby causing the tones to be included in the initial audio tape or to be broadcast as part of a live transmission. Alternatively, the tones can be permanently put on a tape with the related sound effects so that the tones are always automatically generated at the appropriate time. The Touch-Tone generator 40 could also be permanently wired into sound effects generator operating automatically when a button is pushed.

Preferentially, the tone lasts two television frames (about one-fifteenth of a second), is masked by the usual sounds of the program played at the same time or otherwise temporally adjacently, and has less volume than a show's normal sound effects. In this manner, the Touch-Tone are substantially indiscernible to the listener. Despite this, a Touch-Tone decoder as used in this embodiment can reliably detect and decode such Touch-Tones. As known in the art, a decoder "listens" for a very specific pair of frequencies for each tone. The tones have no harmonic or subharmonic relationship to any of the others, and the two tones of each pair must be of substantially the same duration as each other. In the present invention, the controller 54 listens for pairs of specific duration, and only pairs of that duration will be employed to encode information.

It will be apparent to anyone skilled in the art that any set of tones can be utilized to communicate game control information. This communication can take place at any time during the broadcast, and the tones can be assigned different meanings depending on the show and how the home game is to be played.

Each Touch-Tone is assigned a pair of frequencies according to the "DTMF" ("Dual Tone Multi-Frequency") system known in the art. There are sixteen pairs recognized by Touch-Tone decoder 106.

The following example is one illustration, based on a home game designed for playing along with a television game show, the "Family Feud." The Touch-Tones corresponding to the given buttons on a telephone and given pairs of frequencies as assigned the following meanings in this example:

| Frequencies (Hz) | Telephone Button | Meaning Assigned |
| --- | --- | --- |
| 697 and 1209 | 1 | Begin round One |
| 697 and 1336 | 2 | Begin round Two |
| 770 and 1209 | 4 | Begin "Fast Money" round Part One |
| 770 and 1336 | 5 | Begin "Fast Money" round Part Two |
| 941 and 1477 | 0 | Reset |
| 941 and 1477 | # | Yes |
| 941 and 1209 | * | No |

The "zero" button tone is added to the beginning of the audio-video tape 44 of the "Family Feud Show" by the Touch-Tone generator 40 and tape recorder 46, to tell the home game to reset. It is masked by the buzzer sound effect ordinarily played while the master of ceremonies (M.C.) explains the rules of the game show. The tone can be masked by having it occur just before or after or during the buzzer sound effect. The tone is very short in duration and not as loud as the buzzer.

After the master of ceremonies reads the first survey question, there is a bell that rings as soon as the first participant pushes his answer button. Concomitant with this bell, the engineer adds a "one" tone to the tape 44. This signifies the start of round one of the show.

The studio participant suggests a likely response to the survey question. If he is correct that his answer was a popular response by those previously surveyed, a chime will sound, and a "#" tone is included on the audio-video tape 44. If incorrect, a buzzer goes off, and a "*" tone is made on the audio-video tape.

At the beginning of the second round of "Family Feud", a bell rings when a participant first pushes an answer button, making a "two" tone to signify the beginning of round two.

Similarly, a "four" tone will accompany the beginning of the final "Fast Money" round, and a "five" tone signifies part 2 of "Fast Money". In the "Fast Money" round, to be considered correct in the game of the present invention and therefore be signalled by a "#" tone, the participant's answer must match at least 25% of the survey response. Otherwise, a "*" tone will be added to the audio-video tape 44.

When the program audio-video tape 44 is broadcast, the audio portion of the signal includes not only the usual sound effects, music, and dialogue of the program, but also includes coded information in the form of Touch-Tones. These tones are part of the usual in-band transmission, yet convey more information. When received, each tone in the signal is substantially indiscernible by humans since it is very brief, masked by usual sound effects, and relatively quiet.

In FIG. 2, an encoded signal is received by an ordinary unmodified television 48. The television is tuned to the proper station to receive the program with the encoded signal. The audio portion of the show emanates from the television speaker 50 as usual. Since the tape 44 includes brief, quiet Touch-Tones, these emanate from the speaker 50 but are substantially indiscernible to humans. The game device 52 has a controller 54, however, which detects the tones if placed within the listening area of the speaker 50.

Answer buttons 56, 58, 60, and 62 are wired to the controller 54. These buttons allow the player or players of the home game to input their response to the action of the program they are observing on the television 48. In this example, the players listen to the survey question and the television contestant's response. If the home player thinks that the contestant's answer is correct (appears in the survey results), he pushes his "yes" button 64, 66, 68 or 70. Otherwise, he pushes his "no" button 72, 74, 76 or 78.

These responses can be accompanied by sound effects produced by the controller 54, through its speaker 79, or through speakers on the answer buttons 56, 58, 60 and 62. For instance, the first "No" response will be accompanied by a low, descending sound. Subsequent "No" responses will cause correspondingly lower sounds. The first "Yes" response will be attended by a higher, ascending tone. Subsequent "Yes" responses will generate even higher ascending noises.

The controller 54 detects and decodes the Touch-Tones described above, and locks out further response from the players' answer buttons 56, 58, 60 and 62 when it detects a "#" Yes signal or a "*" No signal which informs it whether the studio contestant was correct. Then the controller 54 compares this to responses received from the home players.

The controller 54 tallies the score depending on which Round is being played (Round Two scores are doubled, and Round Three scores are tripled) and whether the answer was correct. The controller 54 causes various information to be displayed. Digital readouts 80, 82, 84 and 86 display the current score for each player. Indicator lights 88, 90, 92 and 94 show what answer each player has given. Indicator lights 95, 96, 97 and 98 show which player was first, second, third, or fourth to input his response. Of course, other information could be displayed in a number of ways apparent to one skilled in the art. The displays could be part of the controller 54 or the individual answer buttons 56, 58, 60 and 62.

Several seconds later, the controller 54 releases the lockout and once again accepts responses from the home players to the next question on the show.

The game device 52 is powered by a power cord 99 attached to a wall outlet 100. Alternatively, the device 52 can be powered by batteries.

The controller 54 is shown in greater detail in FIG. 3. The Touch-Tones are detected by a microphone 101. This signal is processed through a band-pass filter 102 and an amplifier 104. Each of these components can be a single stage op-amp such as a standard National Semiconductor L.M. 741. Alternately, the two can be combined in a double stage op-amp.

The signal is then decoded by a Touch-Tone decoder 106, which can be a Mitel 8870 or SSI 202. The Touch-Tone decoder 106 only accepts frequency pairs of the same length, and can be used to accept only Touch-Tones of a given length. To accomplish this, the Touch-Tone decoder 106 is crystal controlled via a crystal 107. This is a standard 3.579545 MHz color television crystal. The crystal 107 provides a stable time reference for the Touch-Tone decoder 106.

When the decoder 106 detects a Touch-Tone, it provides a signal representing the tone on wires 108, 110, 112 and 114. These four wires carry the four bits needed to distinctly indicate one of sixteen possible Touch-Tones.

The central processing unit (CPU) 116 can be a MC6870545 semiconductor chip. It has 2K bytes ROM storage, 128K bytes RAM storage, and a 3.579545 MHz crystal 117. The CPU 116 continuously polls the decoder 106 via a signal on a wire 118 through an a port 119 approximately every 3 milliseconds to determine whether the decoder 106 has detected a Touch-Tone. If the polling is defective, the decoder 106 sends a signal via a wire 120 to an interrupt 121 of the CPU 116. Upon receiving the interrupt signal, the CPU 116 immediately polls the decoder 106 again. If the decoder 106 has detected a Touch-Tone, the CPU 116 sends a signal over wires 122 and 123 to enable the decoder 106 to transmit the identity of the detected tone to the CPU 116. This transmission is sent via decoder output wires 108, 110, 112 and 114 as discussed above, connected to CPU input wires 124, 126, 128 and 130.

For instance, when the four bit code for the "zero" tone is reported to the CPU 116, it resets its memory to initial conditions to prepare for a new game.

The enable wire 122 simultaneously disables the input buffer/isolator 132 via a wire 134. The buffer/isolator 132 can be a standard 74LS245. This disabling prevents input switches 136 from interfering with the communication of the decoder 106 with the CPU 116.

When the "one" tone is reported to the CPU 116 via decoder output wires 108, 110, 112 and 114, the CPU 116 prepares for round one of the game. The CPU does this by disabling the decoder 106 via wire 123 and enabling the buffer/isolator 132 by wire 134, from a signal on wire 122.

Once the master of ceremonies reads the first question to the studio contestant and the contestant gives a response, the home players will indicate their agreement or disagreement with that response on their answer buttons 56, 58, 60 or 62. These buttons are used as input switches 136 to the controller 54. The yes and no signals are fed through an input debounce circuit 138, which can be a MPS A14. The debounce levels off the fall and rise of the signals to emit even signals to the buffer/isolator 132.

Since this example involves four players and two possible responses each, the buffer/isolator 132 uses eight lines 124, 126, 128, 130, 140, 142, 144 and 146 to communicate the responses to the D port 148 of the CPU 116.

The players can input a response until the continuous polling via wire 118 reports to the CPU 116 that the decoder 106 has received another tone from the game show revealing a "#" yes or "*" no correct answer. When this occurs, the CPU 116 disables the buffer/isolator 132 in order to lock out further responses by the players and enables the decoder 106 to communicate the correct answer to the CPU 116 as described above.

The CPU 116 compares the correct answer to the responses given by the home players via input switches 136. Each player that was correct is awarded some number of points. Alternatively, the first player to have responded correctly could be awarded more points than the later correct responses. Incorrect responses could result in subtraction of points.

The CPU 116 causes the scoring information to be displayed via its B port 150. After an examination of the present application, various methods to display the information available from this port will be apparent to those skilled in the art. Some of these methods are described in *Electronic Display Devices* by Richard Perez, published by Tab Books in 1987, especially pp. 176–178. For example, illustration 5-35 of that book depicts a seven segment display as shown in FIG. 3.

Wires 200, 202, 204, and 206 are connected from the B port 150 to the digit selector 152. These wires carry a four-bit binary code representing which digits of the score displays 80, 82, 84 or 86 or indicator lamps 88, 90, 92, 94, 95, 96, 97 or 98 should get power to enable them to receive scoring information. The wire 212 enables the digit selector 152 to receive a new instruction from the CPU 116. The digit selector 152 is a 72 HC 4514 multiplexer and is attached to the digit current sources 154 via the 16 wires 208. At a given time, only one of these 16 wires will be "on", and the other 15 will be "off". The one that is "on" will correspond to one of the 16 wires 210 of the digit current sources 154 that will enable the correct digit of the score displays 80, 82, 84, or 86 or indicator lamp 88, 90, 92, 94, 95, 96, 97, or 98 to receive scoring information. For example, when wire 211 is selected, the hundreds digit of score display 80 is enabled.

After a digit or lamp is enabled, the CPU 116 disables the digit selector 152 via wire 212. Then, the CPU 116 causes the scoring information to be available at the B port 150 in binary code. The enabled digit or lamp receives this information via wires 212, 214, 216, 218, 200, 202, 204, and 206 and is updated accordingly.

For example, when the scoring information from the CPU 116 is that the first digit of a score display 80 is to be changed to a "1", wires 214 and 206 are "on" and wires 212, 216, 218, 200, 202, and 204 are "off". Wire 214 tells the first segment 220 of the first digit of display 80 to glow. Likewise, wire 206 informs the second segment 222 that it should glow. When segments 220 and 222 flow, they form a "1" in the hundreds place of score display 80.

Sound effects can easily be generated by one skilled in the art from the output of the A port 119. FIG. 3 shows one way. Some methods of accomplishing this are described in Motorola's user manual for its complex sound generator microchip SN 76495. Wires 160 and 162 provide information to two analog multiplexers (MC14052) 164 to decide which external programming elements 166 to select. These elements are preferentially resistors and capacitors as shown but may also be diodes or other devices. The selected elements are connected from the ground 167 through the multiplexers 164 to the complex sound generator (Motorola microchip SN76495) 168 via wires 224, 226, 228 and 230.

Depending on which of elements 166 are selected, the elements modify the operation of the oscillators contained in the complex sound generator 168. The Complex Sound Generator 168 is a large scale integrated microchip containing various oscillators summed, cascaded or sequenced to form the sound. The generated sounds emanate from the speaker 170, with the volume being controlled by the variable resistor 172.

For developmental purposes, an eight position dip switch 174 acts as a program select connected to the C port 176. It simulates various input conditions of the D port 148 in order to test the device's reaction to the CPU 116 output from the A port 119 and B port 150.

The encoded communication need not involve a game show. It can represent any information that can be communicated with a discrete number of coded terms. For example, it can represent events in a sporting contest, where the home players predict plays or events. It can represent weather predictions, winning lottery numbers, "secret" messages on children's shows requiring a special decoder, or many other things.

Since the communication is encoded in-band in tones of the audible range, the broadcast signal can be taped with the encoded information still available for later or repeated use.

Since the device detects the information by "listening" to the receiver's audio output, the device needs no connection to the receiver. It can be placed anywhere in the room or listening area. The device can be placed at any orientation to the receiver; it need not be aimed or placed next to the receiver.

I claim:

1. A device for playing a game, comprising:
   a microphone capable of receiving information from a communication receiver;
   a touch tone decoder electrically coupled to said microphone;
   a processing unit electrically coupled to said decoder;
   input means for a player of said game to input a response to a broadcast program, electrically coupled to said processing unit; and
   display means for displaying scoring information relevant to said response, electrically coupled to said processing unit.

2. Apparatus comprising
   means for receiving, from the audio output emanating from a speaker of an ordinary communication receiver of the class comprising television and radio receivers, a broadcast signal comprising (a) a program signal and (b) time-varying information encoded with said program signal in a manner so as to be substantially indiscernible to humans observing said output;
   means for detecting said time-varying information in said broadcast signal; and
   decoding means for decoding said information to achieve decoded information.

3. The apparatus of claim 2
   wherein said information is encoded in tones of a predetermined volume range; and
   wherein said tones are masked by sounds of a broadcast signal; and
   wherein said tones have less volume than said sounds.

4. The apparatus of claim 3 further comprising means for reducing false signalling by screening out those tones occurring for other than a predetermined length of time.

5. Apparatus as in claim 3, wherein said decoding means is responsive to a plurality of said tones, and wherein a volume of a first one of said plurality of tones is substantially within a predetermined ratio to a volume of a second one of said plurality of tones.

6. The apparatus of claim 2 wherein
   said means for detecting is not connected to said communication receiver; and
   said means for detecting can detect said information while said detecting means is placed anywhere in a listening area of, and at any orientation to, said communication receiver.

7. Apparatus for playing a game comprising
   means for receiving, from the audio output emanating from a speaker of an ordinary communication receiver of the class comprising television and radio receivers, a broadcast signal comprising (a) a program signal and (b) time-varying information encoded in-band in said broadcast signal with said program signal in a manner so as to be substantially indiscernible to humans observing said output, said time-varying information being useful for participation in said game;
   means for detecting said time-varying information in said broadcast signal; and
   means, electrically coupled to said means for detecting, for decoding said encoded information to achieve decoded information.

8. The apparatus of claim 7 including input means for a player of said game to input a response to the said information encoded in said broadcast signal.

9. The apparatus of claim 8 including:
   first logic means, electrically coupled to said input means and said decoding means to compare said response to said decoded information; and
   second logic means, electrically coupled to said first logic means, which scores said response to said decoded information.

10. The apparatus of claim 9 including display means, electrically couple to said second logic means, for displaying scoring information.

11. The apparatus of claim 9 wherein said second logic means is capable of preferentially scoring said responses depending on the relative sequential order in which the players respond.

12. The apparatus of claim 8 wherein said broadcast signal is of a game show, and said response comprises choosing whether the show's contestant made a correct answer.

13. The apparatus of claim 8 wherein said broadcast signal is of a sporting event, and said response comprises a prediction of an event in said sporting event.

14. The apparatus of claim 8 including lockout means for rendering said response ineffectual if entered after a specified event occurs.

15. The apparatus of claim 8 electrically coupled with display means for indicating the relative sequential order in which the players respond.

16. The apparatus of claim 7 wherein said broadcast signal is of a game show.

17. The apparatus of claim 7 wherein said signal includes tones in a predetermined volume range and said decoding means is capable of decoding information encoded in such tones.

18. Apparatus as in claim 17, wherein said decoding means is responsive to a plurality of said tones, and wherein a volume of a first one of said plurality of tones is substantially within a predetermined ratio to a volume of a second one of said plurality of tones.

19. The apparatus of claim 7 wherein said tones are ordinary "Touch-Tones", are masked by a broadcast signal's sounds, and have less volume than said sounds.

20. The apparatus of claim 7 wherein said signal includes tones in a predetermined volume range and said decoding means is capable of decoding information encoded in such tones; and further comprising means for reducing false signalling by screening out those tones occuring for other than a predetermined length of time.

* * * * *